(12) United States Patent
Barrall et al.

(10) Patent No.: US 8,215,727 B2
(45) Date of Patent: Jul. 10, 2012

(54) CARRIERLESS STORAGE SYSTEM ENCLOSURE WITH EJECTION MECHANISM

(75) Inventors: Geoffrey S. Barrall, San Jose, CA (US); Julian M. Terry, Mountain View, CA (US); Mark J. Herbert, Danville, CA (US)

(73) Assignee: Drobo, Inc., San Jose, CA (US)

( * ) Notice: Subject to any disclaimer, the term of this patent is extended or adjusted under 35 U.S.C. 154(b) by 682 days.

(21) Appl. No.: 12/101,708

(22) Filed: Apr. 11, 2008

(65) Prior Publication Data

US 2009/0016009 A1  Jan. 15, 2009

Related U.S. Application Data

(60) Provisional application No. 60/911,799, filed on Apr. 13, 2007, provisional application No. 60/917,507, filed on May 11, 2007.

(51) Int. Cl.
*A47B 81/00* (2006.01)
(52) U.S. Cl. .................. 312/223.2; 312/319.1; 312/333
(58) Field of Classification Search ............... 312/223.2, 312/223.5, 319.1, 332.1, 333; 361/679.37–679.39, 361/724–727
See application file for complete search history.

(56) References Cited

U.S. PATENT DOCUMENTS

| | | | | |
|---|---|---|---|---|
| 4,688,684 A * | 8/1987 | Young et al. | ................. | 211/59.4 |
| 4,833,554 A | 5/1989 | Dalziel et al. | ............. | 360/98.04 |
| 5,454,080 A | 9/1995 | Fasig et al. | .................... | 395/283 |
| 5,564,803 A * | 10/1996 | McDonald et al. | ...... | 312/249.11 |
| 5,764,481 A * | 6/1998 | Ruch et al. | ............... | 361/679.31 |
| 5,788,211 A * | 8/1998 | Astier | ....................... | 361/679.31 |
| 5,825,616 A | 10/1998 | Howell et al. | ................. | 361/684 |
| 5,853,091 A * | 12/1998 | Luenser | ............................ | 211/40 |
| 5,867,458 A | 2/1999 | Barkley et al. | .................. | 369/36 |
| 5,986,881 A | 11/1999 | Yang | ............................. | 361/685 |
| 6,038,099 A * | 3/2000 | Heinze et al. | ................ | 360/92.1 |
| 6,067,708 A * | 5/2000 | Wong et al. | .................... | 361/730 |
| 6,301,105 B2 * | 10/2001 | Glorioso et al. | ......... | 361/679.34 |
| 6,580,606 B1 * | 6/2003 | Leman | ..................... | 361/679.33 |
| 6,646,882 B2 * | 11/2003 | Shih | ............................. | 361/724 |
| 6,882,525 B2 * | 4/2005 | Paul et al. | ................ | 361/679.37 |
| 7,031,152 B1 * | 4/2006 | Tsai et al. | ................ | 361/679.33 |
| 2004/0173544 A1 | 9/2004 | Chen | ............................... | 211/26 |
| 2006/0056103 A1 * | 3/2006 | Hamming | ................. | 360/97.01 |
| 2006/0080689 A1 * | 4/2006 | McCormack et al. | ........ | 720/657 |

FOREIGN PATENT DOCUMENTS

DE 19544186 6/1997
EP 1 647 982 A2 4/2006

OTHER PUBLICATIONS

European Patent Office, Written Opinion/Office Action dated Jan. 26, 2010, Application #08745660.4, filed Apr. 11, 2008.
NETGEAR, Inc., Reference Manual for the NETGEAR Storage Central SC101, Sep. 2005, 54 pp.
Harrison Goddard Foote Patent & Trademark Attorneys; European Patent Attorney: Jonathan D M Atkinson, Response to Communication Pursuant to Article 94(3) EPC for European Application No. EP08745660.4 dated Aug. 5, 2010, 5 pages.
European Patent Office, Communication pursuant to Article 94(3) EPC, Application No. 08745660.4, dated Feb. 13, 2012, 7 pages.

* cited by examiner

*Primary Examiner* — Hanh V Tran
(74) *Attorney, Agent, or Firm* — Sunstein Kann Murphy & Timbers LLP

(57) ABSTRACT

A carrierless storage system enclosure includes an ejection mechanism to permit installation and removal of data storage devices (e.g., hard disk drives) without tools, carriers, and manual cabling.

14 Claims, 6 Drawing Sheets

CARRIERLESS STORAGE SYSTEM ENCLOSURE WITH EJECTION MECHANISM

CROSS-REFERENCE TO RELATED APPLICATIONS

This application claims priority from the following U.S. provisional patent applications, each of which is hereby incorporated herein by reference in its entirety:

U.S. patent application Ser. No. 60/911,799 entitled Storage System Enclosure filed Apr. 13, 2007; and U.S. patent application Ser. No. 60/917,507 entitled Storage System Enclosure filed May 11, 2007.

TECHNICAL FIELD

The present invention relates to digital data storage systems, and particularly to enclosures for digital data storage systems.

BACKGROUND ART

Storage system enclosures are typically designed to hold several data storage devices such as hard disk drives. Unfortunately, many storage system enclosures are difficult to use, requiring tools and/or carriers to install and remove data storage devices and requiring manual connection and disconnection of cables. For example, even a relatively simple storage system enclosure known as the NetGear Storage Central SC101, which is carrierless, requires a tool to open and close the enclosure and requires manual connection and disconnection of cables. The NetGear Storage Central SC101 is described in Reference Manual for the NETGEAR Storage Central SC101, NetGear document no. 202-10104-01, September 2005.

SUMMARY OF THE INVENTION

In accordance with one embodiment of the present invention, an enclosure for multiple digital data storage devices includes a plurality of chassis modules, a chassis, a cover, a front plate, and a back plate. Each of the chassis modules has an opening for receiving a digital data storage device. The chassis supports the chassis modules within the enclosure. The cover substantially surrounds the chassis and the plurality of chassis modules. The front plate attaches to the open front of the cover, and has an opening providing access to the plurality of chassis modules. The back plate attaches to the open back of the cover.

In other embodiments, each of the chassis modules may include a latch. The latch may be spring loaded and may secure a digital data storage device within the chassis module after a user inserts the storage device. To release the storage device, the chassis module may also have a latch release that protrudes through and is operable from the front plate. The chassis module may also include an ejection spring that ejects the digital data storage device when a user depresses/activates the latch release. In some embodiments, the chassis modules may be stackable.

In accordance with still other embodiments, the enclosure may also have a plurality of drive slot indicators and a plurality of system indicators. The drive slot indicators provide indications of operation status for each of the slots. The system indicators provide indications of operation status for the system as a whole.

The drive slot indicators may be located on the back plate. In such embodiments, a plurality of light tubes may transmit the light to the front plate so that it is visible to a user. The light tubes extend from each of the plurality of drive slot indicators to a plurality of first openings on the face plate. Each of the first plurality of light tubes may be located within an individual chassis module.

In a similar manner as the drive slot indicators, the system indicators may be located on the back plate or the chassis. In either embodiment, a second plurality of light tubes transmit the light to the front plate. The second plurality of light tubes extend from each of the plurality of system indicators to a plurality of second openings on the face plate.

In accordance with other embodiments, the back plate may include a plurality of electrical connections. The electrical connections allow a user to connect the enclosure and the storage devices to external computer systems.

Each chassis module may also include a flap that can open and close. The flap covers the slot in the chassis module when closed. The flap may also have a flap spring that biases the flap towards the closed position. The flap folds into the enclosure when a user inserts a digital storage device into one of the plurality of chassis modules.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Illustrative embodiments of the present invention provide an enclosure for digital data storage devices. The enclosure allows for easy storage, containment, and connection of digital data storage devices to external computer systems. Generally, the enclosure includes a cover, a front plate, and a back plate. Each enclosure can hold a plurality of data storage devices.

Figure 1:
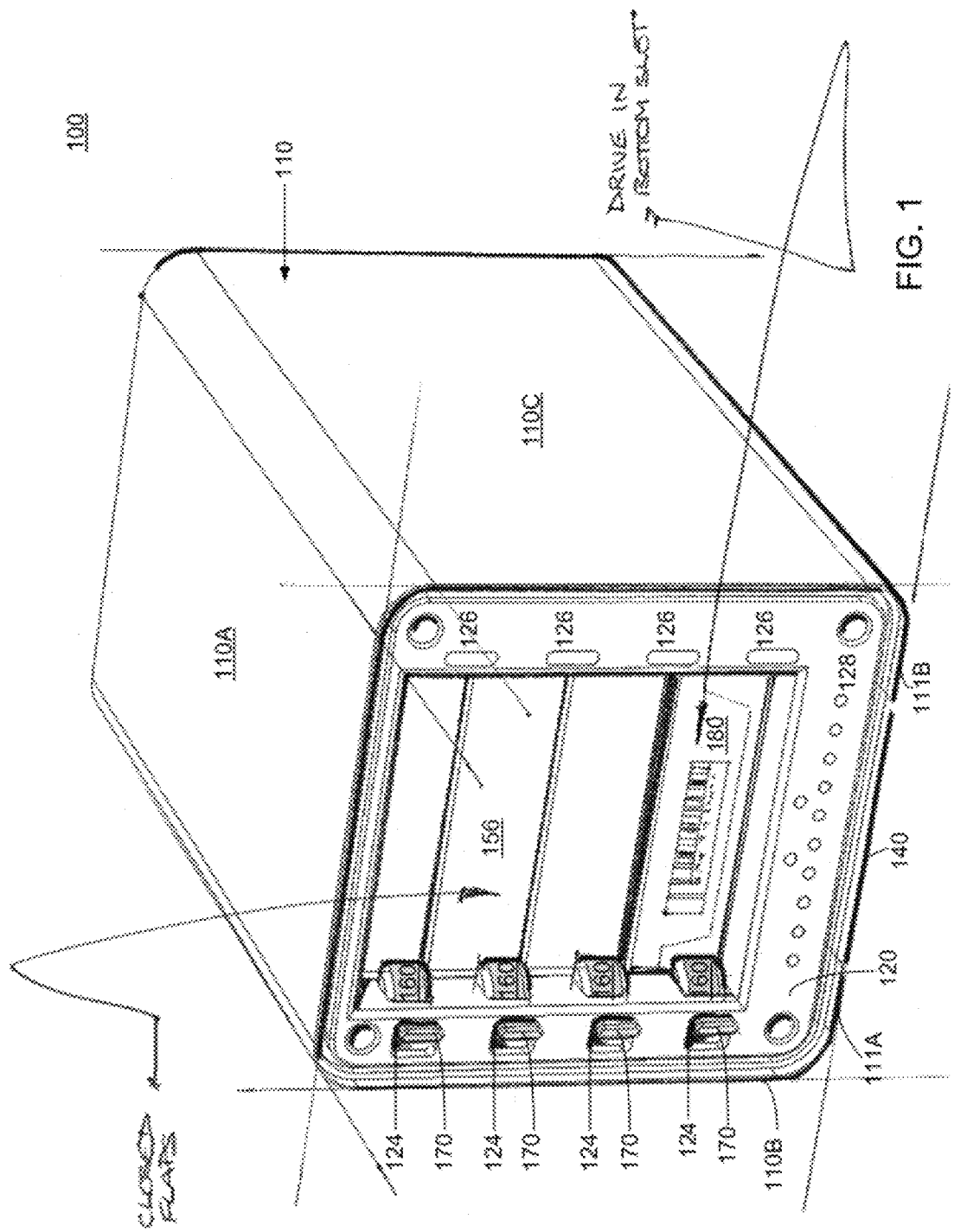
FIG. 1 schematically shows an enclosure for digital data storage devices in accordance with en exemplary embodiment of the present invention.

FIG. 1 schematically shows an enclosure 100 in accordance with embodiments of the present invention. The enclosure 100 includes a cover 110, a front plate 120, and a back plate 130 (FIG. 2) that define the external structure of the enclosure 100. In some embodiments, the enclosure may also have a bottom plate/chassis 140.

The cover 110 may be substantially rectangular and open at either end. The cover 110 may only have 3 sides 110A, 110B, and 110C (for example, a top 110A, a left side 110B, and a right side 110C) to facilitate assembly and/or removal of the cover 110 by sliding the cover 110 over the storage devices 180, chassis modules 150, and chassis 140. The cover may also have flanges 111A and 111B that extend inwards at the bottom of the cover 110 and wrap around the underside of enclosure 100 to help hold the cover 110 in place.

The front plate 120 has a large opening 122 that provides access to several chassis modules 150 located within the enclosure 100. To the left of large opening 122 (viewed from the front of the enclosure 100), the front plate 120 has latch openings 124 that allow latches 160 and latch releases 170 (described in detail below) to pass through the front plate 120. To the right of the large opening 122, the front plate 120 has drive slot indicator openings 126 that allow a user to view status indicators associated with each of the digital data storage devices 180 and slots. Below the large opening 122, the front plate 120 has system indicator openings 128 that allow a user to view status indicators associated with the enclosure system 100 as a whole. It is important to note that the locations for each of the openings described above are provided for illustrative purposes only. The locations of the openings can be located anywhere within the boundaries of the front plate 120. For example, openings 126 can be located to the left of the large opening 122, openings 124 can be located to the right of the large opening 122, and the openings 128 can be located above the large opening 122. Alternatively, all or some of the openings can be located elsewhere on the enclosure 100 (e.g., on the back plate 130 or the cover 110).

Figure 2:
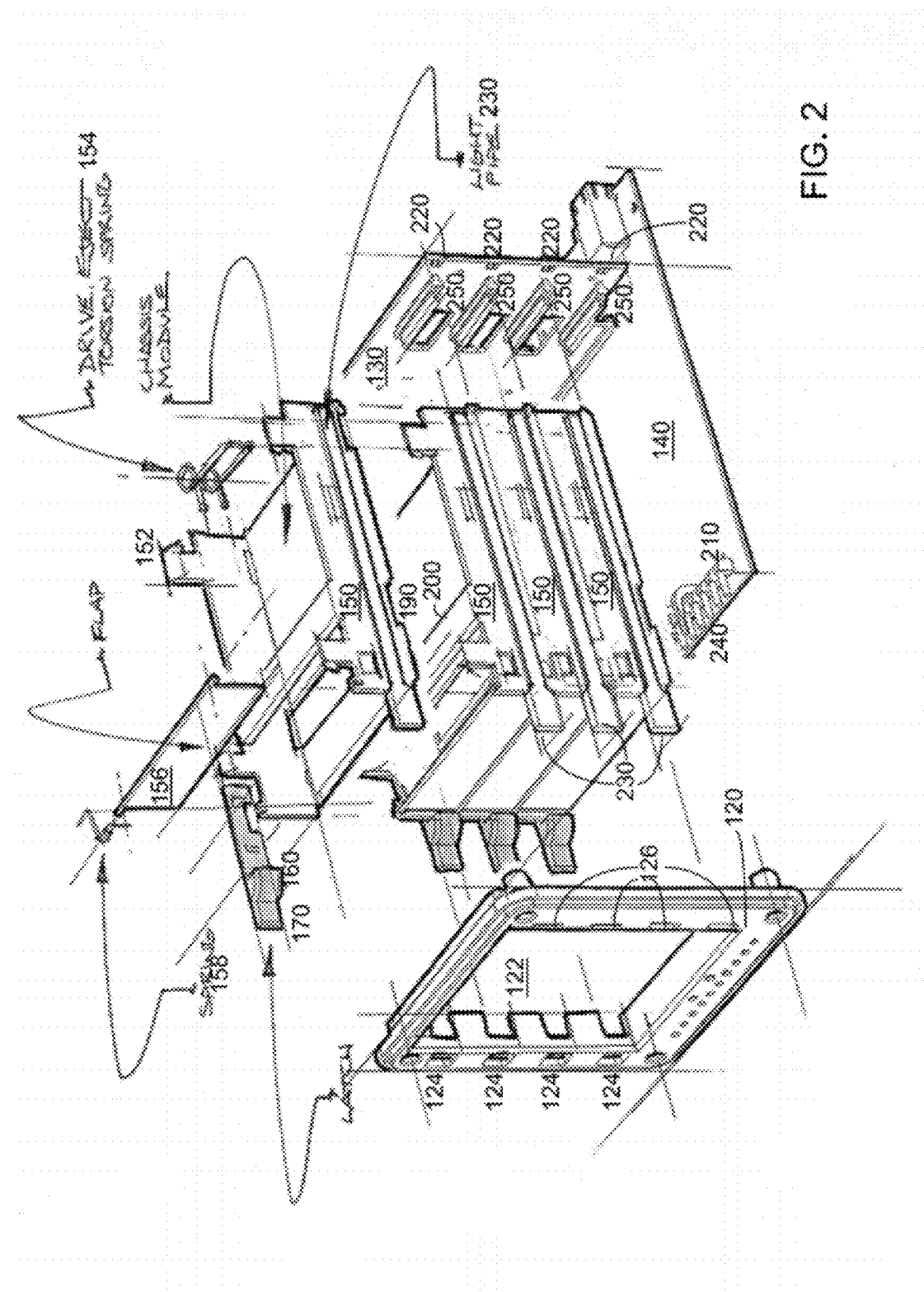
FIG. 2 schematically shows an exploded view of the enclosure shown in FIG. 1.

As shown in FIG. 2 and mentioned above, the enclosure includes chassis modules 150 (in this example, four substantially identical modules) that have slots to receive and hold the digital data storage devices 180. The chassis modules 150 may be stackable so that a single enclosure 100 can contain more than one chassis module 150. The chassis modules 150 may include clips 152 that facilitate interconnection/stacking of the modules 150. Additionally, each chassis module 150 may include a latch 160 that prevents the storage device from sliding out of the chassis module 150. The latch 160 may be spring loaded so that it retracts as a user inserts the storage device 180, and then snaps into place to secure the storage device 180 in the module 150.

To release the latch 160, the latch 160 or the chassis module 150 may include a latch release 170. As shown in FIG. 1, the latch release 170 can be a tab that extends through the latch openings 124 on the face plate 120. When a user wishes to release the storage device 180 from the enclosure 100, the user need only slide the latch release 170 to the left, causing the latch 160 to clear the storage device 180 and release the storage device 180 from the chassis module 150. In some embodiments, the chassis module 150 may include a drive eject spring 154, that ejects the storage device 180 from the chassis module 150 (and therefore the enclosure 100) when the user releases the storage device 180, as just described.

It is important to note that, although the latch 160 and latch release 170 are described above as separate elements, the latch 160 and latch release can be (and typically are) integrated as a single unit (see FIG. 2). For example, they may be a single resilient component with a tab (the latch release 170) and a flange (the latch 160). Upon storage device installation, the component deflects to the side, moving the flange to allow insertion of the storage device 180. Once inserted, the resilient component will return to the original shape such that the flange blocks at least part of the slot, and holds the storage device 180 in the chassis module 150. When the user wishes to remove the storage device, the user can deflect the tab to one side, deflecting the resilient component and moving the flange away from the slot. The user can then remove the storage device 180.

In some embodiments, the chassis modules 150 may also include a flap 156 that covers the opening to the chassis module 150 when no storage device is installed. When a user installs a storage device 180, the flap 156 may fold into the enclosure 110 or chassis module 150, allowing the storage device 180 to enter the chassis module 150. The flap 156 may include a spring 158 that biases the flap 156 towards the closed position so that the flap 156 automatically closes when the user removes the storage device 180.

As mentioned above, the chassis modules 150 may be stackable within a chassis 140. In such embodiments, each chassis module 150 can have a groove 190 located on the bottom of the chassis module 150 and a support 200 located across the top of the chassis module 150. The support 200 and the groove 190 can have complimentary shapes so that the support 200 and groove 190 mate, creating easily stackable chassis modules 150.

In some embodiments, the enclosure 100 can have a number of indicators (e.g., LEDs) indicating the status of the overall system as well as each individual storage device 180 and/or slot. For example, the enclosure can have system indicators 210 and drive slot indicators 220. In one embodiment, drive slot indicators 220 are on the back plate 130, while the system indicators 210 are on the bottom plate/chassis 140. In such embodiments, the enclosure 100 can include light pipes 230 and 240 that transmit the light from the indicators 210 and 220 to the front plate 120 so that it is visible to the user.

Specifically, when drive slot indicators 220 are located on the back plate 130, long light tubes 230 can transmit the light to the front plate 120. For example, the long light tubes 230 can extend from the drive slot indicators 220 to the drive slot indicator openings 126 in the front plate 120. The long light tubes 230 allow the user to see the indicator lights. In some embodiments, the long light tubes 230 can be attached to the chassis modules 150, allowing for easy assembly and installation. The long light tubes 230 can be made from a number of materials including a variety of clear acrylics.

Similarly, system indicators 210 can be located on the bottom of the chassis 140 and system light tubes 240 can transmit the light to system indicator openings 128 on the front plate 120. As with long light tubes 230, the system light tubes 240 can be made from a number of materials including a variety of clear acrylics.

Although the location of the indicators 210 and 220 are described as being on the bottom of the chassis 140 and the back plate 130, respectively, they may be located elsewhere on or in the enclosure. For example, in some embodiments, all of the indicators 210 and 220 can be located on the front plate 170 so that they are easily visible to a user.

As described in U.S. patent application Ser. No. 11/267, 960 entitled Storage System Condition Indicator and Method, which is hereby incorporated by reference in its entirety, the drive slot indicators 220 may be in the form of a three-color light (e.g., green, yellow, red). The lights are controlled to indicate which drive/slot/chassis module requires attention (if any). Each three-color light can be placed in at least four states, specifically off, green, yellow, red. The light for a particular slot may be placed in the off state if the slot is empty and the system is operating with sufficient storage and redundancy so that no drive (e.g., storage device 180) need be installed in the slot. The light for a particular slot may be placed in the green state if the corresponding drive is sufficient and need not be replaced. The light for a particular slot may be placed in the yellow state if system operation is degraded such that replacement of the corresponding drive with a larger drive is recommended. The light for a particular slot may be placed in the red state if the corresponding drive must be installed or replaced. Additional states could be indicated as needed or desired, for example, by flashing the light between on and off states or flashing the light between two different colors (e.g., flash between red and green after a drive has been replaced and re-layout of data is in progress). Additional details of an exemplary embodiment are described below.

Of course, other indication techniques can be used to indicate both system status and drive/slot status. For example, a single LCD display could be used to indicate system status and, if needed, a slot number that requires attention. Also, other types of indicators (e.g., a single status indicator for the system (e.g., green/yellow/red) along with either a slot indicator or a light for each slot) could be used.

As discussed above, the enclosure 100 can have multiple chassis modules 150 creating an enclosure with multiple storage device slots. Each slot can either be empty or contain a storage device. Further, each slot has a dedicated indicator (e.g., a drive slot indicator 220) capable of indicating four states: Off, OK, Degraded and Fail.

The states are interpreted generally as follows:

| Indicator State | Meaning for Array User |
| --- | --- |
| Off | Drive slot is empty and is available for an additional drive to be inserted. |
| OK | Drive in slot is functioning correctly. |
| Degraded | Action by user recommend: if slot is empty, add a drive to this slot; if slot contains a drive, replace drive with another, higher-capacity drive. |
| Fail | Action by user required ASAP: if slot is empty, add a drive to this slot; if slot contains a drive, replace drive with another, higher-capacity drive. |

In this exemplary embodiment, red/amber/green light emitting diodes (LEDs) are used as the indicators. The LEDs are interpreted generally as follows:

| LED state | Indicator State | Example circumstances under which state may occur |
| --- | --- | --- |
| Off | Off | Slot is empty. Array has available space. |
| Green | OK | Drive is functioning correctly, array data is redundant and array has available disk space. |
| Amber | Degraded | Array is approaching a Fail condition; Not enough space to maintain redundant data in the event of a disc failure. |
| Red | Fail | Disk in this slot has failed and must be replaced; the array does not have enough space to maintain redundant data storage and more space must be added. |

For example, assuming three slots are populated with storage devices and there is sufficient storage space available to store additional data, the drive slot indicators for the three populated slots would be green (indicating that these storage devices are operating correctly, the array data is redundant, and the array has available disk space), and the indicator for fourth (empty) slot would be off (indicating that no storage device needs to be populated in slot A).

Conversely, the drive slot indicators 220 can indicate if the array does not have enough space to maintain redundant data storage and more space must be added. In an example of this scenario, three slots are populated with storage devices, and the storage devices in two of the populated slots are full. The indicators for the three populated slots would be green (indicating that these storage devices are operating correctly), and the indicator for the fourth slot (e.g., the empty slot) would be red (indicating that the array does not have enough space to maintain redundant data storage and a storage device should be populated in empty slot).

The drive slot indicators can also indicate if the array is unable to maintain redundant data in the event of a failure. In an example of this scenario, all four chassis modules are populated with storage devices. The storage devices in two of the modules are full. The drive slot indicators for three of the modules (the two modules without full devices and one with a full device) would be green (indicating that they are operating correctly), and the indicator for the fourth module (the other full one) would be amber (indicating that the storage device should be replaced with a storage device having greater storage capacity).

In other embodiments, the drive slot indicators 220 may also indicate when a chassis module/storage device has failed. In this example, three modules are populated with storage devices, and one of the storage devices has failed. The indicators for the modules with operating devices are green (indicating that they are operating correctly), the indicator for the module with the failed device is red (indicating that the storage device should be replaced), and the indicator for the empty module is off (indicating that no storage device needs to be populated in the empty slot).

As indicated above, each of the storage devices can be replaced when needed, creating a dynamically upgradeable storage system in which storage devices can be replaced with a larger storage devices as needed. Additionally, in some embodiments, existing data is automatically reconfigured across the storage devices in such a way that redundancy is maintained or enhanced and the additional storage space provided by the larger storage devices will be included in the pool of available storage space across the plurality of storage devices. Thus, when a smaller storage device is replaced by a larger storage device, the additional storage space can be used to improve redundancy for already stored data as well as to store additional data. Whenever more storage space is needed, an appropriate signal is provided to the user (e.g., using green/yellow/red lights substantially as described above), and the user can simply remove a storage device and replace it with a larger storage device.

In some embodiments, the back plate 130 can include a number of electrical connections 250 for connecting the storage devices 180 with external computer systems (not shown). The storage devices 180 can connect directly to the electrical connections 250 or a cable, such as a ribbon cable, can be used. The electrical connections can have a variety of connector types including, but not limited to USB, serial, or parallel port connectors. Additionally, the back plate 130 may have a power supply connection (not shown). The power supply connection may be connected to a power supply (e.g., an outlet) and can supply power to all of the connected storage devices 180, as well as the enclosure itself.

Figure 3:
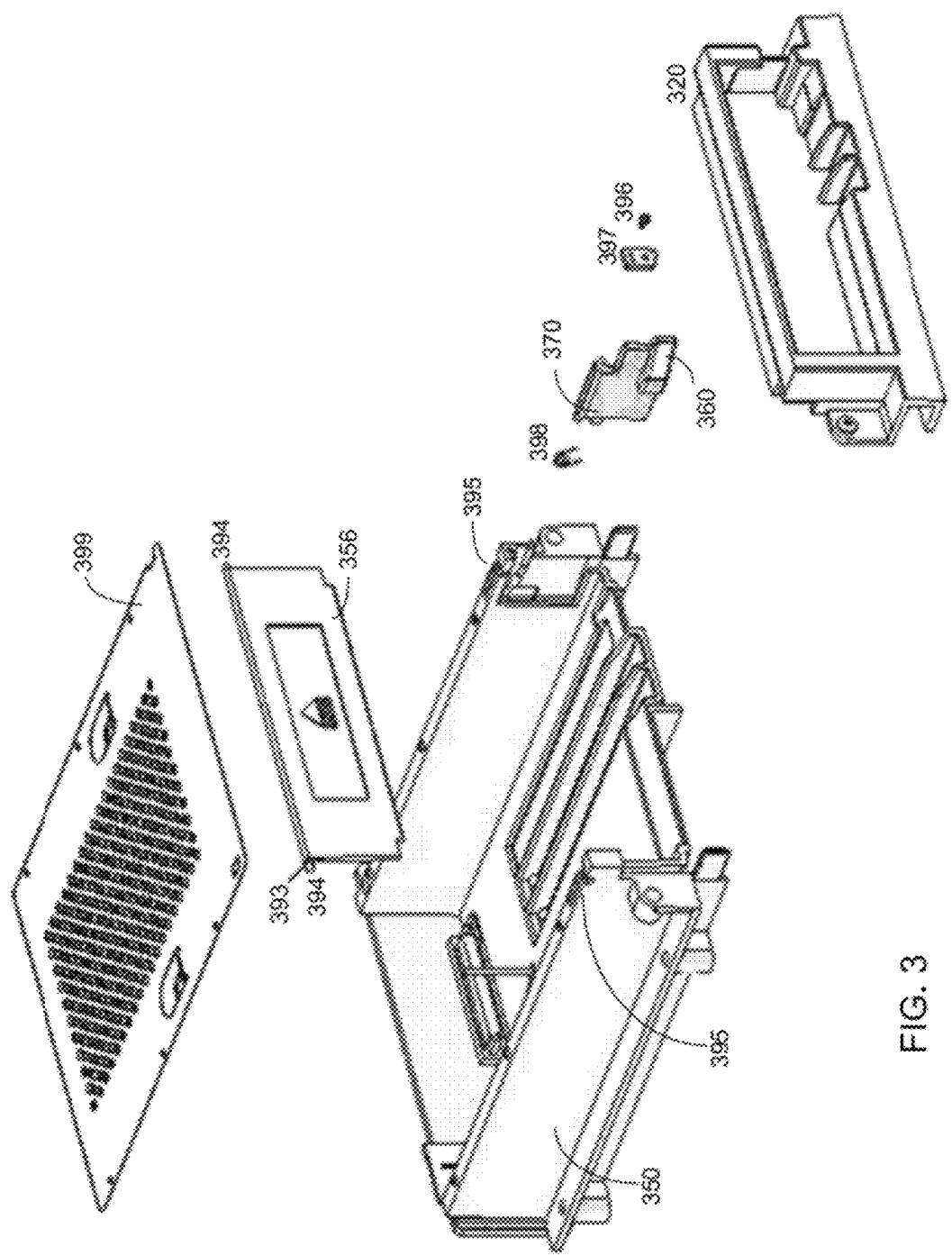
FIG. 3 schematically shows an alternative chassis module configuration in accordance with an embodiment of the present invention.

FIG. 3 shows an alternative chassis module configuration in accordance with an embodiment of the present invention. Similar to the chassis module configurations discussed above, this chassis module configuration includes a carrierless chassis module 350 for supporting a disk drive; a latch release mechanism including latch release 370 with latch 360, spring 398, tab 397, and screw 396; a front plate 356, a front panel 320, and a top plate 399. The latch release mechanism is coupled to the chassis module 350 and works in a similar manner to the latch release mechanism 170 with latch 160 discussed above. The front plate 356 is pivotally coupled to the chassis module 350, specifically by resting tabs 394 in grooves 395; spring 393 biases the plate 356 toward a closed position. The front panel 320 and the top plate 399 are secured to the chassis module 350 via screws. As with the chassis module configuration discussed above, this chassis module configuration allows a disk drive to be secured within the chassis module 350 without the use of a carrier that is secured to the disk drive.

Figure 4:
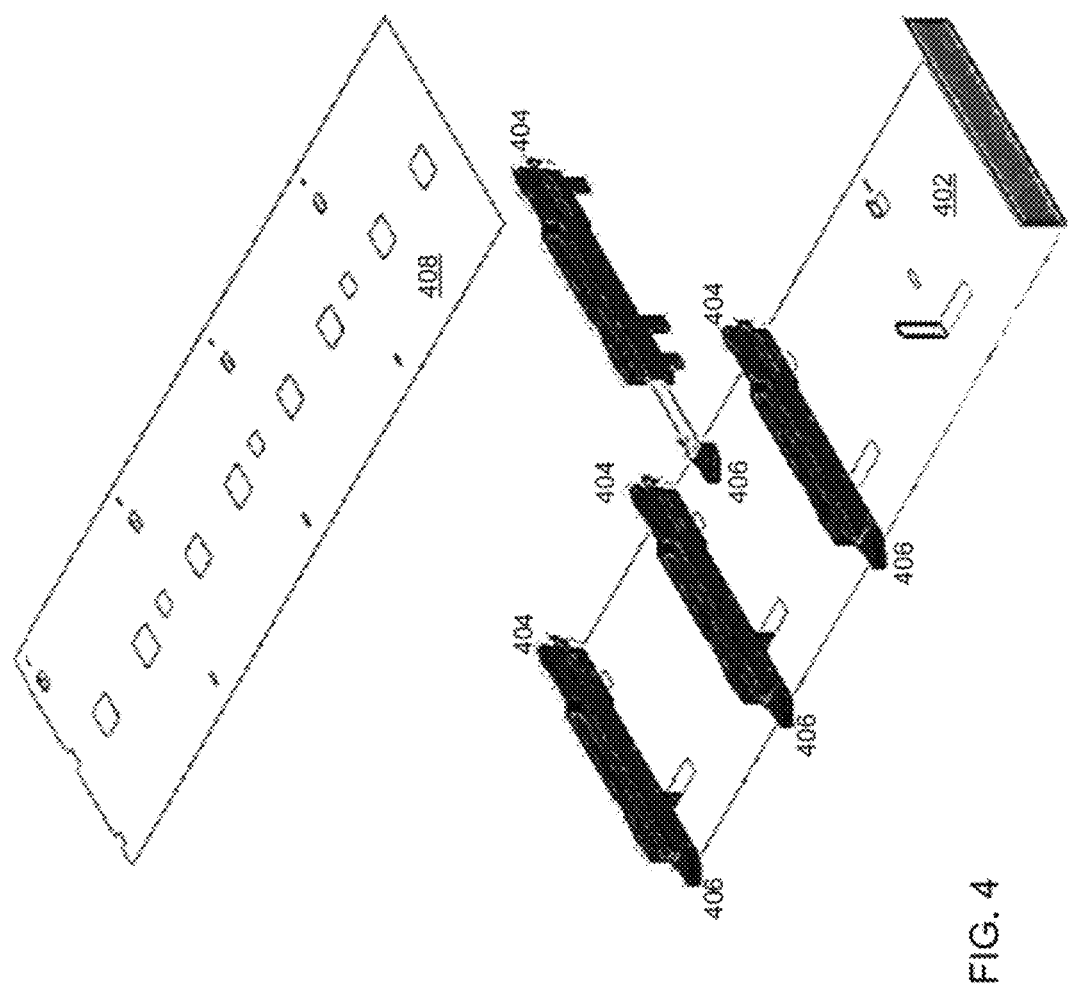
FIG. 4 schematically shows a rack-mount chassis module configuration in accordance with an embodiment of the present invention.

FIG. 4 shows an alternative chassis module configuration in accordance with an embodiment of the present invention. In this embodiment, four carrierless chassis module slots are formed side-by-side in a rack-mount configuration. Specifically, the chassis module slots are formed from a bottom plate 402, four supports 404 that fit into respective slots in the bottom plate 402, and a top plate 408 that is configured to couple with the tops of the supports 404 to form an enclosure. Each support 404 includes a latch member 406 that operates in a manner similar to the latch release 170 with latch 160 discussed above. As with the chassis module configurations discussed above, this chassis module configuration allows disk drives to be secured within the chassis module slots without the use of carriers that are secured to the disk drives.

In exemplary embodiments, the enclosure 100 is typically used in conjunction with a "vanity" cover that goes over the front cover 120 during normal use. In an exemplary embodiment, the vanity cover is coupled to the enclosure 100 using magnets that are positioned behind the front cover 120 and act on metallic elements in the vanity cover. It should be noted that the magnets may be located in the vanity cover and the metallic elements may be included in the enclosure in an alternative embodiment. Among other things, the use of magnets allows the vanity cover to be installed and removed without any tools.

Figure 5:
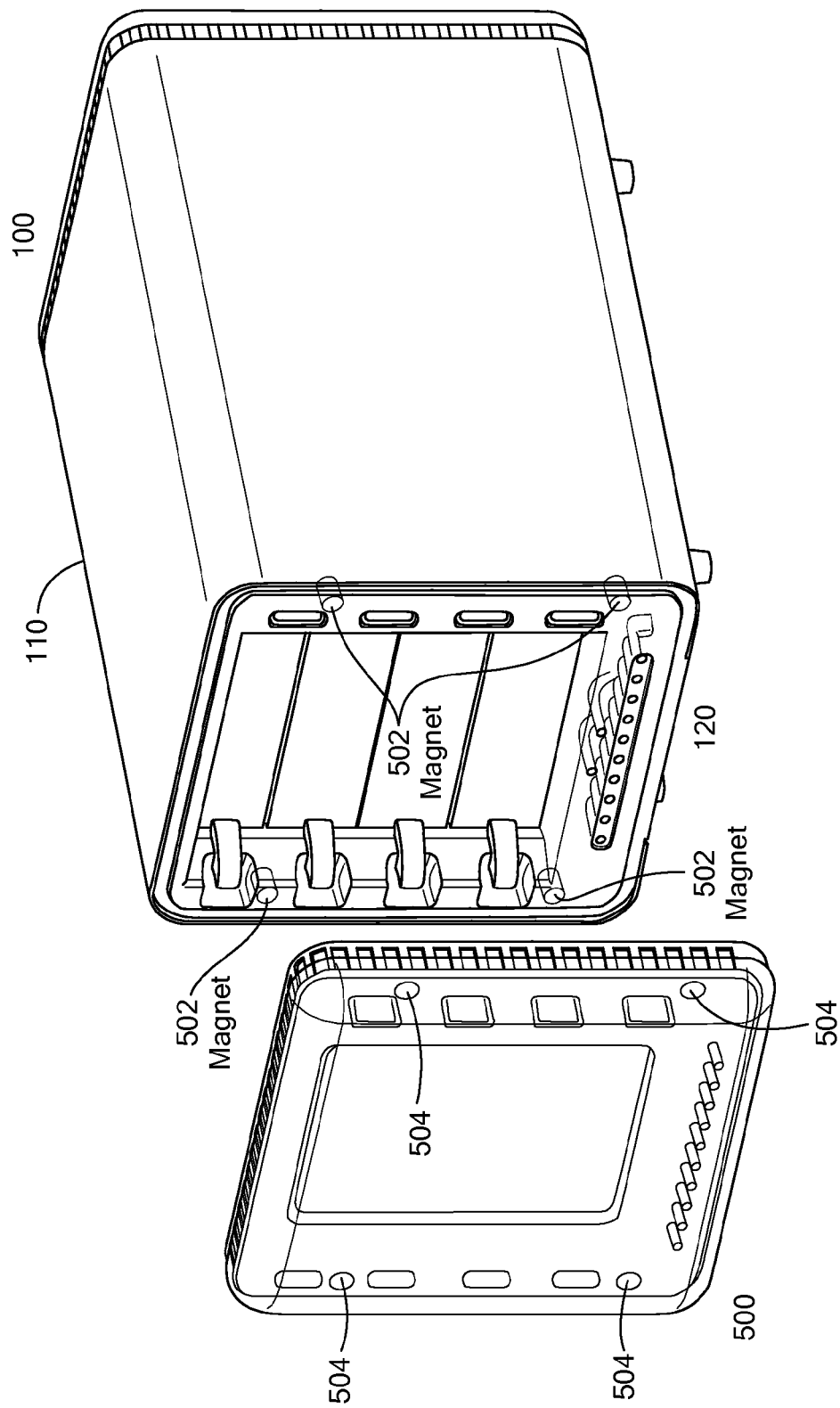
FIG. 5 shows a see-through view of the enclosure and the vanity cover in accordance with an exemplary embodiment.

FIG. 5 shows a see-through view of the enclosure 100 and the vanity cover 500 in accordance with an exemplary embodiment. The enclosure 100 includes magnets 502 behind front cover 120, and the vanity cover 500 includes metallic elements 504 that align with the magnets 502 when the vanity cover 500 is placed onto the enclosure 100.

Figure 6:
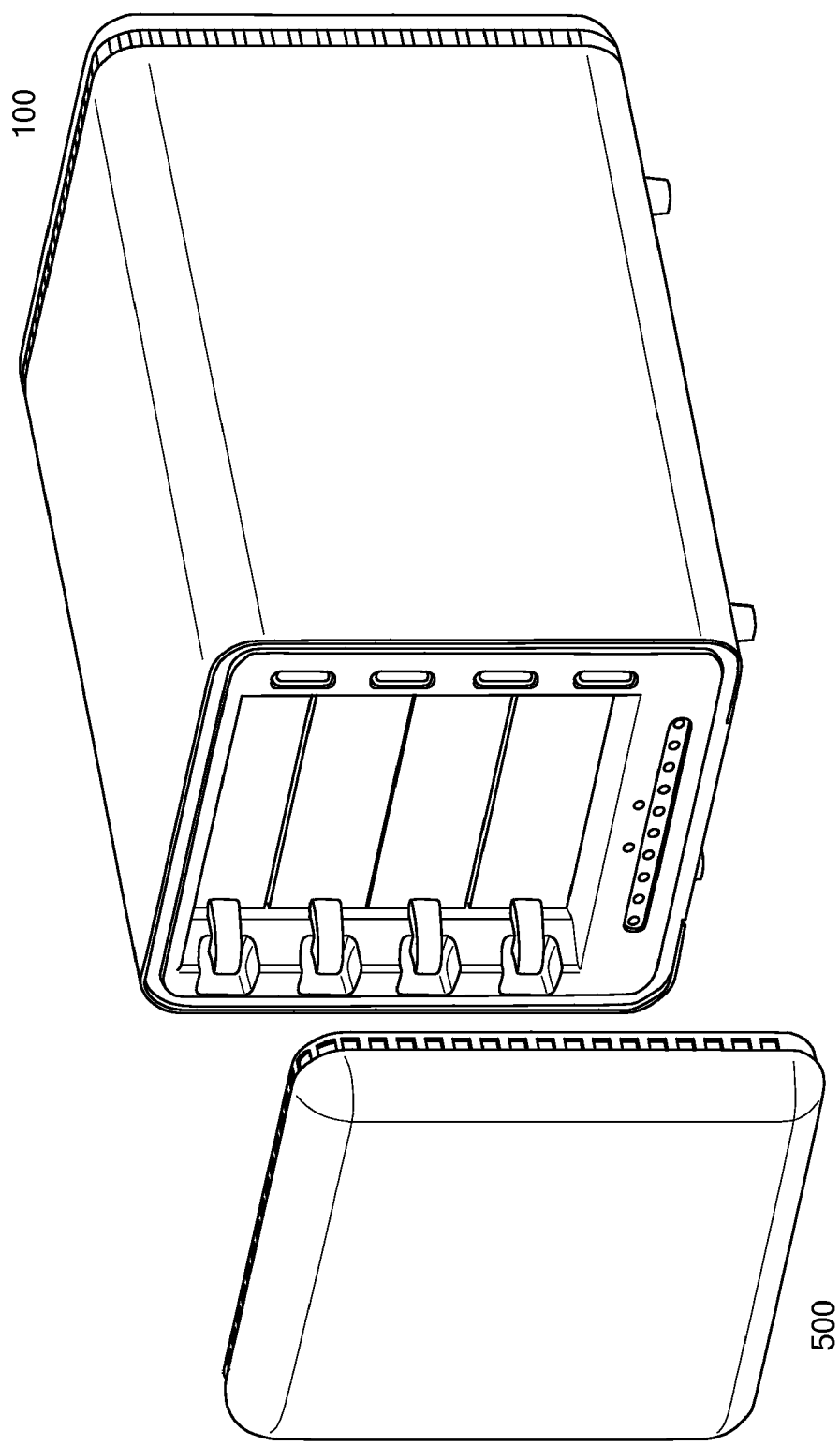
FIG. 6 shows an exemplary vanity cover in greater detail.

As shown in FIG. 6, in an exemplary embodiment, the vanity cover is transmissive black plastic that hides the front of the enclosure 100 but allows light from the various light pipes and indicators to pass through.

Although the above discussion discloses various exemplary embodiments of the invention, it should be apparent that those skilled in the art can make various modifications that will achieve some of the advantages of the invention without departing from the true scope of the invention.

What is claimed is:

1. A data storage system comprising:
an enclosure for housing at least one or more chassis modules;
a chassis module having a slot to receive a storage device without the use of a carrier, the chassis module including clips that facilitate interconnection of the chassis module with another chassis module in a stack configuration;
a connector for direct connection with the storage device when the storage device is installed in the chassis module, the connector providing at least one of electrical connections and data connections for the storage device;
the chassis module including a latch for selectively securing the storage device within the chassis module and releasing the storage device from the chassis module, the latch including a latch release tab and a flange, the latch release tab and the flange integrated into a single resilient latch component that deflects when the storage device is being inserted such that the flange is moved to allow insertion of the storage device into the chassis module and, once inserted, the component returns to its original shape such that the flange blocks at least part of the slot and holds the storage device in the chassis module, wherein the latch release tab allows the component to be manually deflected to move the flange away from the slot to release the storage device;
a front plate having a large opening through which the storage device can be inserted into the chassis module and a latch opening through which the latch release tab protrudes through the front plate so as to allow such releasing of the storage device; and
the chassis module including an ejection mechanism for ejecting the storage device when storage device is released, whereby the storage device can be installed without use of separate connectors and cables.

2. A system according to claim 1, further comprising:
a back plate including the connector, wherein the back plate and the chassis module are positioned so as to align the connector with the storage device.

3. A system according to claim 1, wherein the ejection mechanism includes an ejection spring positioned so as to compress when the storage device is inserted in the chassis module.

4. A system according to claim 1, further comprising:
a door movably coupled to the chassis module, the door covering the opening when no storage device is installed in the chassis module.

5. A system according to claim 1, further comprising:
a light tube extending from a back of the chassis module to a front of the chassis module.

6. A system according to claim 1, further comprising:
a storage manager in communication with the connector, the storage manager adapted to redundantly store data in the storage device via the connector.

7. A data storage system comprising:
an enclosure for housing at least one or more chassis modules;
a plurality of stacked chassis modules that are interconnected by clips, each chassis module having a slot to receive a storage device without the use of a carrier, each chassis module including a latch for selectively securing the storage device within the chassis module and releasing the storage device from the chassis module and an ejection mechanism for ejecting the storage device when the storage device is released, the latch including a latch release tab and a flange, the latch release tab and the flange integrated into a single resilient latch component that deflects when the storage device is being inserted such that the flange is moved to allow insertion of the storage device into the chassis module and, once inserted, the component returns to its original shape such that the flange blocks at least part of the slot and holds the storage device in the chassis module, wherein the latch release tab allows the component to be manually deflected to move the flange away from the slot to release the storage device;
a front plate having a large opening through which the storage device can be inserted into the chassis module and a latch opening through which the latch release tab protrudes through the front plate so as to allow such releasing of the storage device; and a plurality of connectors for direct connection with the storage devices when the storage devices are installed in the chassis modules, the connectors providing at least one of electrical connections and data connections for the storage devices, whereby storage devices can be installed without use of separate connectors and cables.

8. A system according to claim 7, further comprising:
a back plate including the connectors, wherein the back plate and the chassis modules are positioned so as to align the connectors with the storage devices.

9. A system according to claim 7, wherein each ejection mechanism includes an ejection spring positioned so as to compress when a storage device is inserted in the chassis module.

10. A system according to claim 7, wherein each chassis module includes, for each opening, a door that covers the opening when no storage device is installed in the corresponding chassis module.

11. A system according to claim 7, wherein each chassis module further comprises:
a light tube extending from a back of the chassis module to a front of the chassis module.

12. A system according to claim 7, further comprising:
a storage manager in communication with the plurality of connectors, the storage manager adapted to redundantly store data in the storage devices via the connectors.

13. A system according to claim 7, further comprising:
a plurality of status indicators, each status indicator associated with a chassis module, wherein the plurality of status indicators are controlled to provide a status indication for each chassis module.

14. A system according to claim 7, further comprising:
at least one storage device installed in the plurality of chassis modules.

* * * * *